United States Patent [19]
Lloyd

[11] 4,395,708
[45] Jul. 26, 1983

[54] SAMPLING AND LEVEL SHIFTING APPARATUS TO OPERATE IN CONJUNCTION WITH A LIQUID CRYSTAL DISPLAY FOR CONVERTING DC ANALOG DRIVE SIGNALS TO AC SIGNALS

[75] Inventor: Randahl B. Lloyd, San Marcos, Calif.

[73] Assignee: Hughes Aircraft Company, El Segundo, Calif.

[21] Appl. No.: 219,162

[22] Filed: Dec. 22, 1980

[51] Int. Cl.³ .............................................. G09G 3/36
[52] U.S. Cl. ................................... 340/784; 340/805; 340/812; 340/793; 340/719; 350/333
[58] Field of Search ............... 340/713, 805, 784, 793, 340/811, 812, 718, 719; 350/330, 331, 333

[56] References Cited

U.S. PATENT DOCUMENTS

| 4,100,579 | 7/1978 | Ernstoff | 340/793 |
| 4,137,523 | 1/1979 | Mukaiyama | 340/805 |
| 4,231,035 | 10/1980 | van Doorn et al. | 340/805 |
| 4,298,866 | 11/1981 | Hodemaekers | 340/713 |

*Primary Examiner*—Marshall M. Curtis
*Attorney, Agent, or Firm*—Robert H. Himes; Lawrence V. Link, Jr.; Anthony W. Karambelas

[57] ABSTRACT

Apparatus which is utilized with a liquid crystal display for applying alternating current driving signals thereto, derived from applied direct current analog signals. The apparatus includes circuitry which samples and stores the applied analog signal. The apparatus also includes circuitry which level shifts the sampled signals so as to have voltage levels which are symmetrically disposed above and below a reference level associated with the liquid crystal display during alternating field times. The symmetrically disposed signals constitute applied alternating current signals to the display, with respect to the reference level.

1 Claim, 5 Drawing Figures

SAMPLING AND LEVEL SHIFTING APPARATUS TO OPERATE IN CONJUNCTION WITH A LIQUID CRYSTAL DISPLAY FOR CONVERTING DC ANALOG DRIVE SIGNALS TO AC SIGNALS

BACKGROUND

The present invention relates generally to liquid crystal displays and more particularly to apparatus which provides alternating current driving signals to liquid crystal displays.

As is known in the art, liquid crystal displays may be fabricated by a number of processes, including metal-oxide-semiconductor (MOS) fabrication techniques incorporating field effect transistor technology. Such liquid crystals may be operated in direct current (DC) or alternating current (AC) modes. As indicated in U.S. Pat. No. 4,100,579 for "AC Operated Flat Panel Liquid Crystal Display," however, the operating lifetimes of liquid crystals may be substantially increased by employing alternating current excitation rather than direct current excitation. Prior art driving arrangements have been utilized which are separate and distinct from the liquid crystal display, and which are not adaptable for integration therewith. In addition, such prior techniques have not prevented DC voltage components from being applied to the liquid crystal material, thus degrading display operation.

SUMMARY OF THE INVENTION

Thus, it is a feature of the present invention to provide an alternating current drive circuit which may be integrated with a liquid crystal display device utilizing the same integrated circuit technology.

Another feature of the present invention is that it provides an alternating current drive circuit which will prevent direct current voltage components from being applied to the liquid crystal display.

Yet another feature of the present invention is to provide a circuit which utilizes the inherent analog storage capability of the liquid crystal display for simulating an alternating current analog signal across each element in the liquid crystal display.

In accordance with the present invention, there is provided a driving circuit for use with a liquid crystal display which provides alternating current driving signals thereto derived from applied direct current analog signals. The present invention comprises circuitry which samples and stores the applied analog signals, and circuitry which level shifts the sampled and stored signals into two predetermined ranges during alternate field times of the liquid crystal display. The level-shifted signals have voltage levels symmetrically disposed above and below a predetermined reference level associated with the liquid crystal display. The level shifted signals in the first range are of opposite polarity of those level shifted signals in the second range.

More particularly, an arrangement of FET transistors and capacitors samples the applied analog signals, stores the sampled signals and then transfers the stored signals on command from various clock and sync signals. Separate circuit arrangements are provided which control the analog signal flow during alternate field times. One circuit comprises a plurality of FET transistors arranged in a NOR-gate configuration but operating in an amplifier mode. This circuit arrangement controls the analog signal flow to the liquid crystal display during one field time and controls those signals which have values between ground and the predetermined reference level of the liquid crystal display. A second circuit arrangement substantially similar in design and operation is provided to control signals which have values in the second range between the predetermined reference level and the power supply voltage. Signals from each of the respective circuits are applied to the liquid crystal display in an alternating manner. Thus, each element of the liquid crystal display sees an alternating current signal which fluctuates above and below the predetermined reference level.

Since the drive circuit is comprised substantially of MOSFET transistors and capacitors, it may be integrated with the liquid crystal display. Since only alternating current signals are applied to the liquid crystal display from the drive circuit, DC voltage components are precluded from interferring with display operation.

BRIEF DESCRIPTION OF THE DRAWINGS

The foregoing and other features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
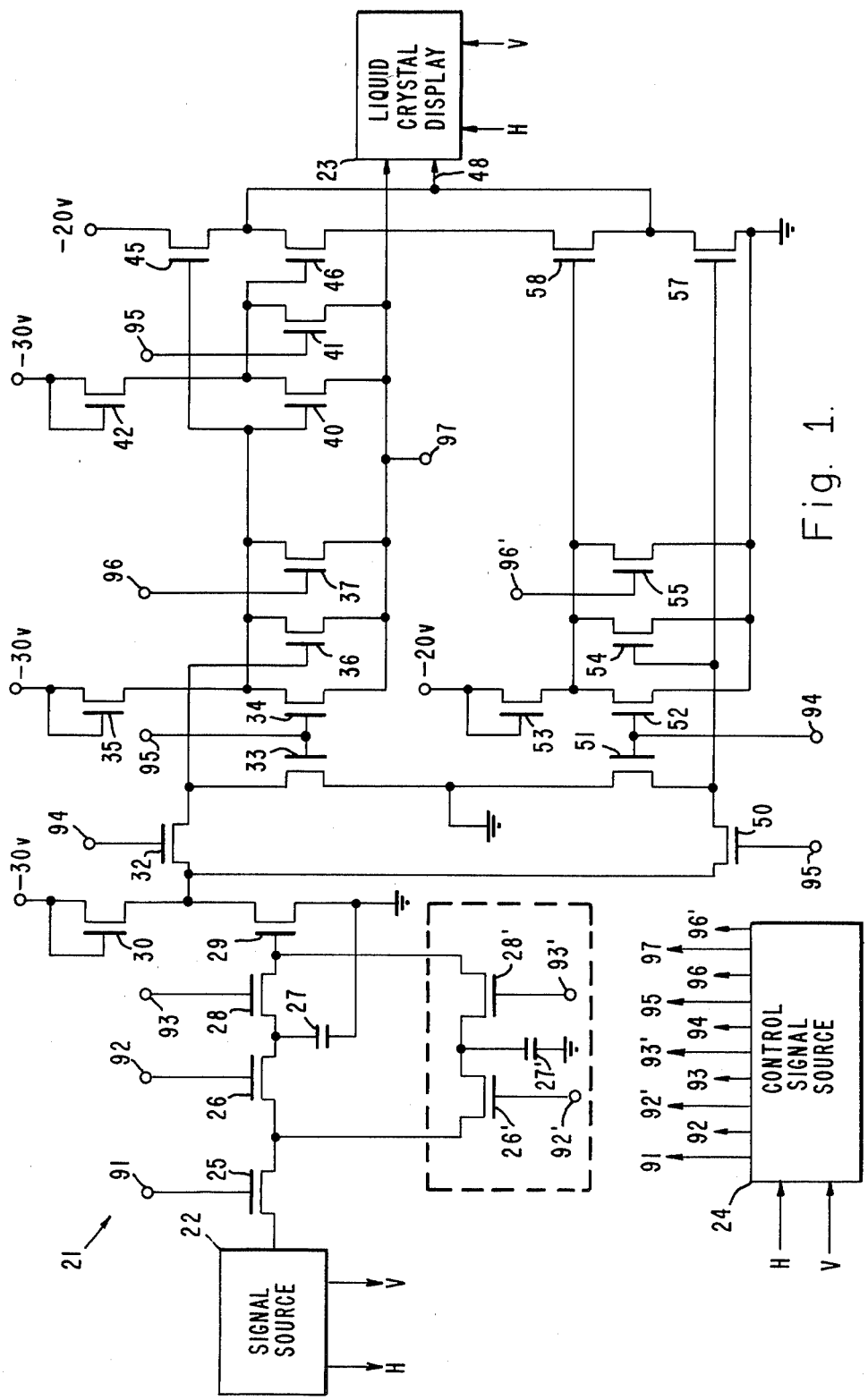
FIG. 1 shows an alternating current liquid crystal drive circuit in accordance with the present invention.

Referring to FIG. 1, there is shown an alternating current drive circuit 21 for use with a liquid crystal display 23 in accordance with the principles of the present invention. A signal source 22, such as a television camera, or the like, provides direct current analog signals to the drive circuit 21. A control signal source 24, which is typically located off-chip, that is, not on the same integrated circuit chip as the drive circuit 21, is provided which supplies the required control and sync signals to the drive circuit 21 and liquid crystal display 23.

The liquid crystal display 23 may be any commonly used display known in the art. A variety of commercially available units such as manufactured by Texas Instruments or Motorola, or the like may be used. However, since the optimum configuration for the drive circuit 21 and display 23 combination is a single integrated circuit, off the shelf components would not normally be used, and a newly fabricated integrated circuit chip would be manufactured containing both circuits. As representative of the liquid crystal display 23 is U.S. Pat. No. 3,862,360 for "Liquid Crystal Display System with Integrated Signal Storage Circuitry". Of particular importance is the generalized display structure shown in FIGS. 6 and 8 thereof, which show the various basic components of the liquid crystal display, and the control signals applied thereto. The interrelationship between the drive circuit 21 and the liquid crystal display 23 will be described more fully hereinbelow.

The circuit 21 may be fabricated by means of metal-oxide-semiconductor (MOS) technology commonly used in the art, so as to be compatable with current liquid crystal display technology. Thus, the circuit 21 may be integrated with the liquid crystal circuitry to provide a single integrated circuit package. Alternatively, the circuit 21 may be fabricated by the use of discrete integrated circuits to obtain substantially the same results.

A shown in FIG. 1, the signal source 22 has its output connected to the input of the drive circuit 21, which includes circuitry for sampling and storing the direct current signals provided by the signal source 22. The signals provided by the signal source 22 have magnitudes in a first predetermined range, typically on the order of 0-1 volts DC. The sampling and storing circuitry includes two MOSFET transistors 25, 26 connected in series, with a capacitor 27 connected from the drain electrode of the second trasistor 26 to ground. The first transistor 25 acts as a sampling transistor which samples the applied analog signal at a predetermined rate. The second transistor 26 gates through preselected sampled signals which are sequentially stored in the capacitor 27. A third transistor 28 is utilized to transfer the signals stored in the capacitor 27 to the input of an inverter amplifier comprising transistors 29 and 30.

An alternate storage channel may be provided which comprises transistors 26', 28' and capacitor 27'. These three elements provide the same function as the above-mentioned elements 26, 27, 28 but are controlled to operate such that when transistor 26 is storing the sample signal in capacitor 27, capacitor 28' is transferring a storage signal from capacitor 27' to the input of the inverter amplifier. Similarly, when transistor 26' is storing a sampled signal in capacitor 27', transistor 28 is transferring a storage signal from capacitor 27 to the input of the inverter amplifier. The sampling and transfer of the sampled analog signal is provided in a conventional manner by means of specific clock signals applied to the gate electrodes of the transistors 25, 26, 26', 28 and 28'.

The remainder of the drive circuit 21 is comprised of two subcircuits which amplify and transfer signals which are above and below the predetermined reference level associated with the liquid crystal display 23. The first subcircuit shown in the upper portion of FIG. 1, comprises an input gating transistor 32 coupled to the output of the inverter amplifier which clocks through sampled analog signals during the first field time of the liquid crystal display 23. The sampled signals are applied to the input of a plurality of MOSFET transistors which are in the form of a NOR-gate configuration which operates in an amplifier mode. This NOR-gate configuration is comprised of transistors 33 through 37. The design and operation of this type of NOR-gate configuration is generally well-known in the art, and reference is made to "MOSFET in Circuit Design" by Robert H. Crawford, McGraw-Hill (1967), Sections 5.3 and 6.4.

The output of the first NOR-gate configuration is applied to the gate electrode of transistor 45. A second NOR gate configuration operating in an amplifier mode is comprised of transistors 40, 41 and 42. This circuit is utilized to level shift the relative ground operating potential associated with bus line 97 to the predetermined reference level. The output of the second NOR-gate configuration is applied to the gate electrode of transistor 46. The output of the first subcircuit of the drive circuit 21 (identified by lead line 48, and hereinafter referred to as output 48) is taken from a point between transistors 45 and 46 and applied to the liquid crystal display 23.

The second subcircuit of the drive circuit 21 is shown in the lower portion of FIG. 1. The second subcircuit comprises a transistor 50 which is utilized to gate through sampled analog signals during the second field time. Transistors 51 through 55 comprise a NOR-gate operating in an amplifier mode similar to the circuit in the first subcircuit discussed hereinabove. The output of the NOR-gate circuitry is applied to the gate electrode of transistor 58 while the sampled analog signal is applied to the gate electrode of transistor 57. The output signals from this portion of the drive circuit 21 is taken from a point between transistors 57 and 58 and applied to the liquid crystal display 23 by way of the output 48. This second subcircuit of the drive circuit 21 operates in the voltage range between ground and the predetermined reference level.

Figure 2:
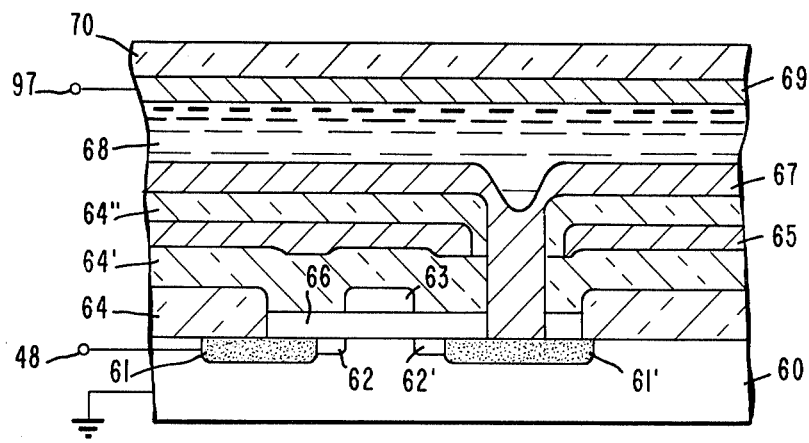
FIG. 2 shows a cross-sectional view of a portion of a typical liquid crystal display which may utilize the present invention.

For a more complete understanding of the present invention, reference is made to FIG. 2 which shows a cross-sectional cutaway view of a portion of the liquid crystal display 23. The display 23 may be what is commonly known as a large area display (100 lines per inch) or a high density display (588 lines per inch), or the like. The display 23 may be fabricated by common processes, such as metal-oxide-semiconductor (MOS) processes, or the like, which are well-known in the art. FIG. 2 shows a portion of the liquid crystal display made by means of a MOS p-channel process, or the like. The liquid crystal display of FIG. 2 comprises an n-type substrate 60 onto which is diffused two p+ diffusion regions 61, 61', a p+ self-aligned implant region 62, a polysilicon gate line 63, gate oxide layer 66, oxide insulator regions 64, 64', 64'', a metal light block 65, a metal top electrode 67, the liquid crystal element 68, and an indium-tin-oxide (ITO) coating 69 deposited on a glass top plate 70. The substrate 60 is generally held at ground potential, while the ITO coating 69 is held at a predetermined reference potential 97. The output 48 of the drive circuit 21 is connected to the first p+ diffusion region 61. The ITO coating 69 is connected to bus line 97 so that the reference potential may be applied thereto.

Figure 3:
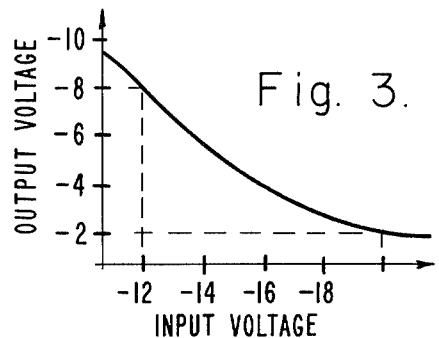
FIG. 3 shows a graph of the input-output characteristics of a portion of the circuit of FIG. 1.

In order to more fully understand the operation of the drive circuit 21, and in particular the operation of the NOR gate configurations thereof, reference is made to FIG. 3 of the drawings and to the second subcircuit of the drive circuit 21. The NOR-gate amplifier configuration comprising transistors 51 through 55 operates as follows. During the first field time, the signals applied to the gate electrodes of transistors 50, 51 and 52 at points 95 and 94 in essence disable this portion of the circuit 21. However, during the second field time, analog signals from the inverter amplifier configuration are gated through transistor 50 to the gate input of transistor 57, and to the gate input of transistor 54. Transistor 52 is a closed circuit which applies minus 20 volts through transistor 53 to the source electrodes of transistors 54 and 55. Transistors 53 and 54, since they are operating in an amplifier mode, have an input/output curve as shown in FIG. 3. Thus, as the voltage level of the applied analog signal applied to the gate electrode of transistor 54 changes, the output applied to the gate electrode of transistor 58 varies as shown in FIG. 3. Transistor 55 has it gate electrode connected to the bias supply source and is utilized to adjust the curve shown in FIG. 3 so that the gain of the first and second subcircuits are substantially identical. Thus, for varying analog input voltages, the output of the NOR gate amplifier varies as given by FIG. 3 and is applied to the input of transistor 58. The sampled analog input is simultaneously applied to the input of transistor 57.

Figure 4:
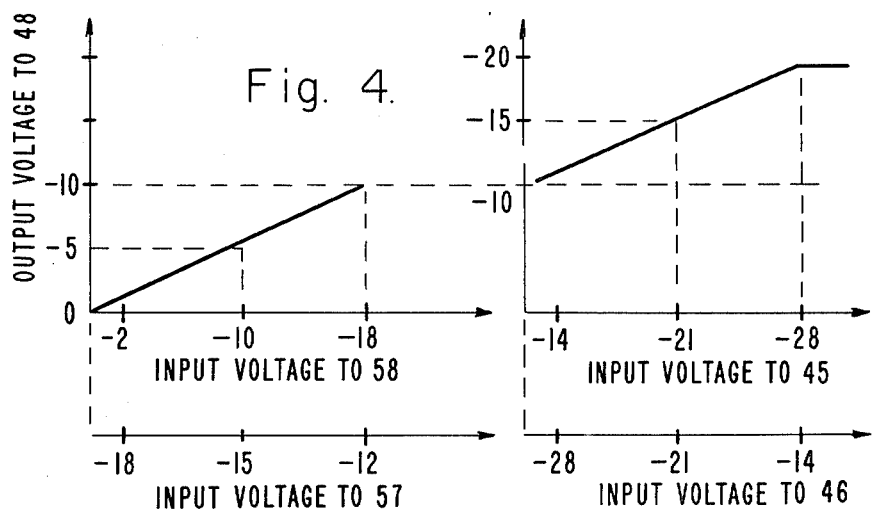
FIG. 4 shows graphs of the output voltage of the drive circuit of FIG. 1 with respect to inputs provided to the output stage of the drive circuit.

An understanding of the overall output characteristics of the drive circuit 21 will be obtained with reference to FIG. 4. Referring to FIG. 4, and to the left-hand portion thereof, there is shown the output 48 from the drive circuit 21 given respective inputs to transistors 57 and 58. The left-hand portion of FIG. 4 shows the output characteristics during the second field time while the right-hand portion shows the characteristics during the first field time. It can be seen that the voltage levels applied to transistors 57 and 58 are complementary, and that a substantially linear output is provided by the drive circuit 21 during the second field time. As can be seen from FIG. 4, the output of the drive circuit 21 during the second field time has voltage levels between ground and the predetermined reference level, which in the case shown in FIG. 4 is approximately −10 volts.

The operation of the top portion of the drive circuit 21 is substantially the same as the section previously described, but further includes the second NOR-gate amplifier which in essence level shifts the ground reference level for the first NOR-gate amplifier comprising transistors 33 through 37. Hence, this circuitry operates in the voltage level from the predetermined reference level 97 (−10 volts) and to the power supply voltage (approximately −20 volts). The operation of this portion of the circuit is substantially the same as described with reference to the lower circuitry and the output characteristics are shown in the right portion of FIG. 4.

The control signal source 24 is utilized to provide control, reference and bias signals 91, 92, 93, 92', 93', 94, 95, 96 and 97. These signals comprise sample pulse 91, read pulses 92, 92', write pulses 93, 93', first field pulse 94, second field pulse 95, bias voltages 96, 96' and the reference level voltage 97. The control signals 91, 92, 92', 93 and 93' control the signal flow to the level shifting circuitry. The first and second field time pulses 94, 95 control the operation of the level shifting circuits of the drive circuit 21. The two field pulses 94, 95 enable or disable the two subcircuits during field time intervals, in which they are high or low, respectively. The bias voltages 96, 96' are utilized to adjust the output voltages from the two subcircuits so that the magnitude of the voltage applied to any particular display element is the same during each field time interval.

Figure 5:
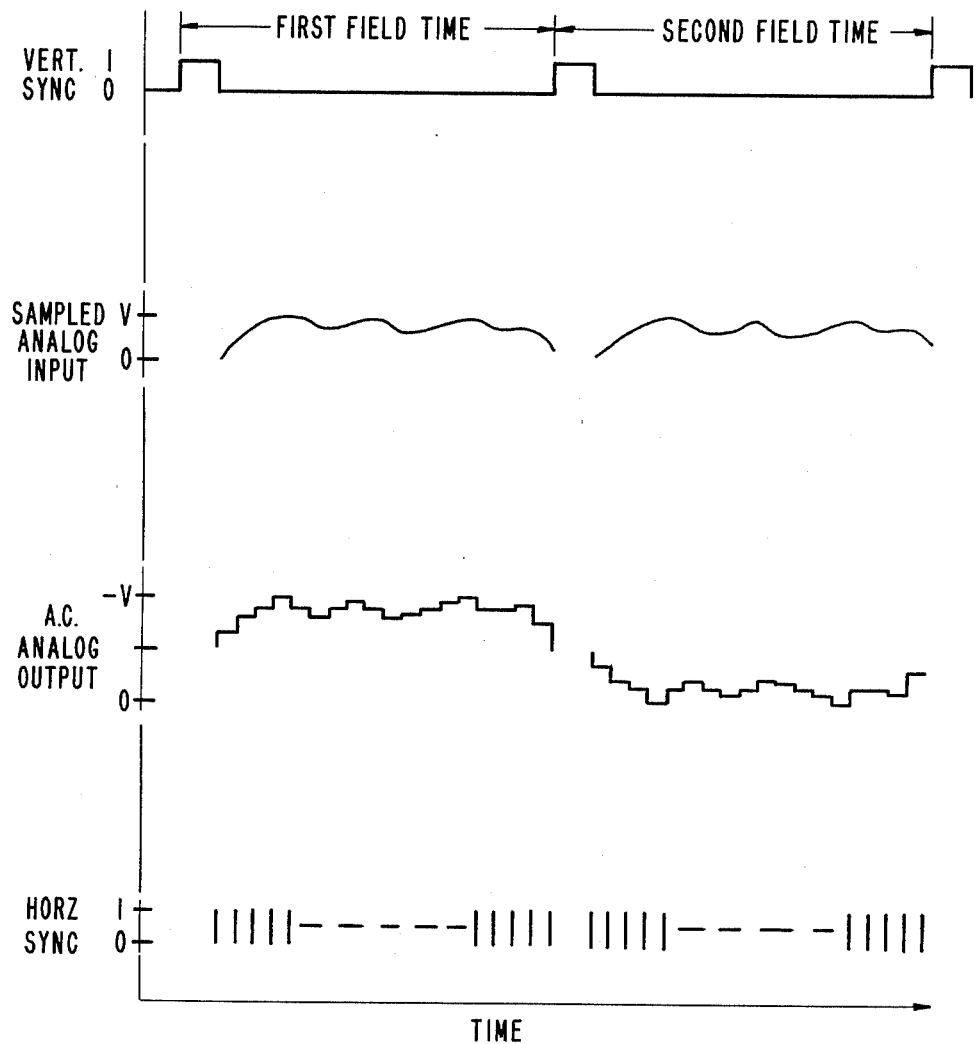
FIG. 5 shows a timing diagram for various signals associated with the circuit of FIG. 1.

Referring to FIG. 5, there are shown various signals which are associated with the drive circuit 21 of FIG. 1. Shown in FIG. 5 is the vertical sync pulse illustrating the first and second field times, and the horizontal sync pulses which are applied to the liquid crystal display 23 during each respective field time. The number of horizontal sync pulses in any field time corresponds to the total number liquid crystal elements in any one line of the liquid crystal display 23. For instance, for a large area display (100 lines per inch), there would be 100 horizontal sync pulses symmetrically disposed within the first field time. For a high density density display (588 lines per inch), there would be 588 horizontal sync pulses in each field time. FIG. 5 also shows a sampled analog for each of the two field times and the corresponding AC analog output which is symmetrically disposed above and below the predetermined reference level in each field time. The analog output is a digitized representation of the analog input and the total number of digital samples shown in the analog output curves correspond to the number of horizontal sync pulses.

In overall operation, the circuit of FIG. 1 provides an alternating current drive signal to the liquid crystal display 23 which is biased symmetrically about the reference potential applied to the ITO coating 69 through the bus 97. The signal source 22 provides direct current analog input signals to the drive circuit 21. On command from the signal source 24, the input signals are sampled by transistor 25 and stored in the capacitor 27. Transistor 28 transfers the stored signal to the inverter amplifier. The inverter amplifier amplifies the input signal by a factor of 2 and applies the amplified signal along either of two paths determined by transistor 32 during the first field time and through transistor 50 during the second field time.

During the first field time, when the first field pulse is high, the first subcircuit of the drive circuit 21, including output transistors 45 and 46, is put in operation, and the second subcircuit is precluded from operation. The first subcircuit takes the output of the inverter amplifier and further amplifies and level shifts the sampled input signal. The output of the drive circuit 21 provided along lead 48 to the liquid crystal display 23 is biased above the reference potential applied to the ITO coating 69 of the display 23 by an amount which is proportional to the voltage level of the sampled signal.

During the second field time, when the second field pulse is high, the second subcircuit is operational. The second subcircuit amplifies and level shifts the input signal to be biased below the predetermined reference level by an amount proportional to the voltage of the sampled signal.

The output signal of the drive circuit 21 is transferred to the p+ diffusion region 61 of the display of FIG. 2. When the polysilicon gate line 63 is high, the signal is transferred to the second p+ diffusion region 61' and hence to the liquid crystal 68 through the metal top electrode 67. The output 48 of the circuit 21 is stored in an element of the liquid crystal display 23, which retains the stored signal for a time period approximately equal to the time period of either the first or second field pulses 94, 95. In the liquid crystal display 23, each storage element is addressed only once each field time interval. The resultant stored signal from the drive circuit 21 alternates in potential about the predetermined reference potential applied to the ITO coating 69 and has a period twice that of the field time interval. The liquid crystal 68 is therefore provided with an alternating current driving signal applied between the liquid crystal 68 and the ITO coating 69.

In order to insure that the alternating current signals provided by the drive circuit 21 are symmetrical with reference to the predetermined reference potential 97, bias signals 96, 96' are applied to transistors 37 and 55 respectively of the drive circuit. The bias signals 96, 96' allow for adjustment of the operating characteristics of the two subcircuits in an independent manner so as to balance the alternating analog signal.

The signal sampling and processing by the drive circuit 21 and the subsequent application of alternating current signals to the liquid crystal display 23 is provided in a manner similar to that of conventional television signal processing. Vertical sync pulses are provided to syncronize signal flow for each field scan of the display 23. Horizontal sync pulses synchronize the application of signals to the appropriate liquid crystal element of the display 23. The sample pulse 91 controls the sampling of the applied analog signal in the time inverval between horizontal sync pulses. For example, vertical sync pulses are applied at a rate of 60 Hz. The horizontal sync pulses are at a rate of 15.8 kHz. The sampling rate is then at a rate of 15.8 kHz times the number of line elements in a display row, say 100, yielding a rate of 1.58 kHz.

Thus, there has been provided a drive circuit which provides alternating current signals to a liquid crystal display. The circuit may be comprised of discrete components or may be integrated as part of the liquid crystal display during the fabrication process. The circuit prevents inadvertent application of direct current voltage components from being applied to the liquid crystal display. The circuit utilizes the inherent analog storage capability of the liquid crystal display for providing alternating current analog across the element of the display.

It is to be understood that the above-described embodiment is merely illustrative of but a small number of the many possible specific embodiments which represent applications of the principles of the present invention. We do not wish to be limited to the specific driving circuit configuration. In addition, numerous and varied other arrangements may readily be devised in accordance with these principles by those skilled in the art without parting from the spirit and scope of the invention.

What is claimed is:

1. Apparatus for use with a liquid crystal display which provides alternating current driving signals thereto derived from direct current analog signals, said apparatus comprising:

first means for sampling and storing said applied analog signals in response to first predetermined control signals applied thereto;

second means coupled to said first means for transferring said stored analog signals in response to second predetermined control signals;

third means coupled to said second means for level shifting said analog signals applied thereto into a first predetermined range associated with said liquid crystal display during a first field time; and fourth means coupled to said second means for level shifting said analog signals applied thereto into a second predetermined range associated with said liquid crystal display, said first and second ranges being symmetrically disposed about a predetermined reference level of said liquid crystal display, said level shifted signals in said second range being of opposite polarity from said level shifted signals of said first range.

* * * * *